Figure 1:
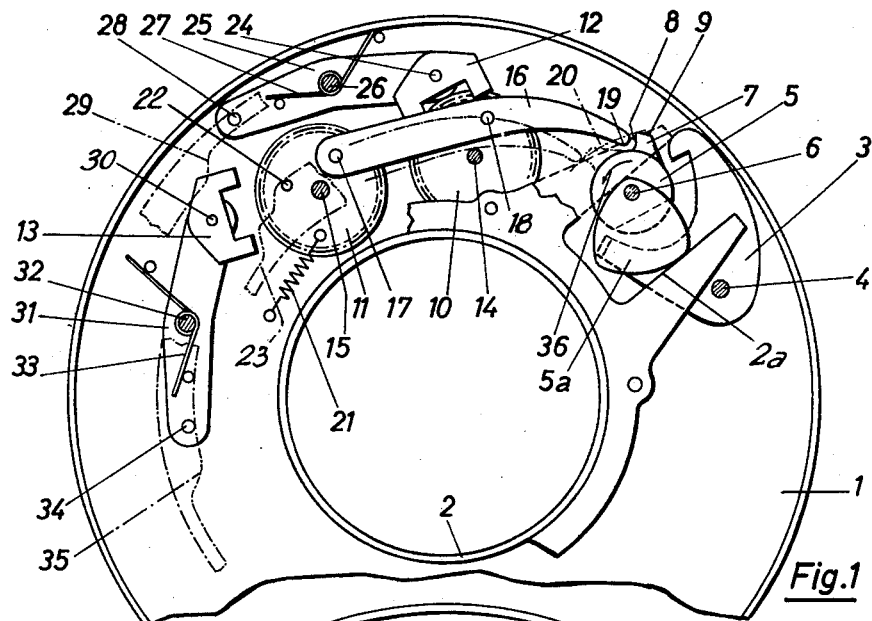

April 2, 1963  G. KIPER  3,083,629
TIMING MECHANISM FOR CAMERA SHUTTERS
Filed April 18, 1960

INVENTOR.
GERD KIPER
BY *Michael S. Striker*
*Attorney*

United States Patent Office 3,083,629
Patented Apr. 2, 1963

3,083,629
TIMING MECHANISM FOR CAMERA SHUTTERS
Gerd Kiper, Unterhaching, near Munich, Germany, assignor to Agfa Aktiengesellschaft, Leverkusen-Bayerwerk, Germany
Filed Apr. 18, 1960, Ser. No. 22,851
Claims priority, application Germany May 2, 1959
14 Claims. (Cl. 95—63)

The present invention relates to cameras.

More particularly, the present invention relates to shutter assemblies of cameras.

Conventional shutter assemblies of cameras are satisfactory for most cameras, but when a camera is required for a special purpose where the camera will make many more exposures than a conventional camera, the conventional timing mechanisms of the shutter assemblies cannot produce the desired results. Thus, for certain purposes it is required that a camera make as many as a million exposures during its life. For example, certain special uses where operations of certain types are being observed call for a camera which must make many more exposures than will ever be required of a conventional camera. The conventional timing mechanisms are simply not up to the requirements of such a specialized camera. After a conventional camera has made less than 10,000 exposures the gears and pivot pins of the timing mechanism are worn and otherwise damaged to such an extent that the camera can no longer operate properly.

It is accordingly one of the primary objects of the present invention to provide a camera shutter assembly with a timing mechanism which will be of such a robust construction that it will be capable of giving efficient performance even if it is required to operate through a million exposures, for example.

Another object of the present invention is to provide a timing mechanism whose components are capable of readily absorbing the shock and other stresses to which such a timing mechanism is subjected during operation.

An additional object of the present invention is to provide a timing mechanism which has its parts cooperating together in such a way that there is a minimum wear of the parts.

It is also an object of the present invention to provide a timing mechanism which can be easily set in order to produce a preselected exposure time.

With the above objects in view the invention includes in a camera shutter assembly a support means and a shutter drive means carried by the support means. In accordance with the present invention a timing means cooperates with this shutter drive means to retard the operation thereof, and the timing means of the invention includes a double crank linkage.

Figure 2:
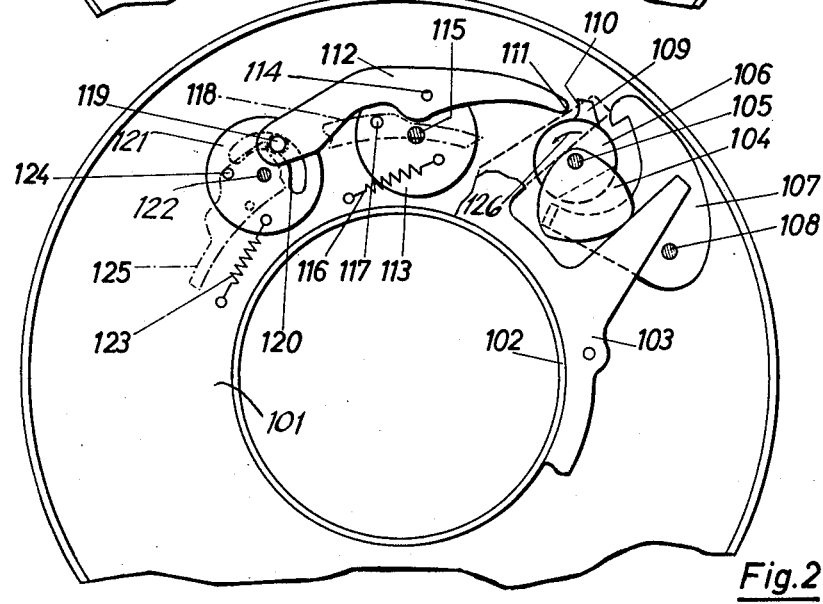

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary elevation taken in a plane normal to the optical axis of the objective of a camera and showing that part of the structure of the invention which is included in a camera shutter assembly; and FIG. 2 is a fragmentary elevation also in a plane normal to the optical axis and showing the components of another embodiment of a structure according to the present invention.

Referring now to FIG. 1, the structure illustrated therein includes a central tubular portion 2 of the shutter housing 1 which forms the support means for the structure of the invention, this central tube 2 having its axis coincident with the optical axis and supporting a shutter ring for rotation in a conventional manner, this shutter ring being connected in a conventional way with the shutter blades so that when the ring turns in one direction around the tube 2 the blades will move from their closed to their open position and when the ring turns back to its starting position the blades will move from their open to their closed position. The structure includes a release lever 3 which is supported for turning movement by a stationary pivot 4 carried by the housing 1, and this lever 3 is actuated in a known way so as to release the shutter drive which will then operate in order to drive the shutter from its closed to its open position and then back to its closed position. This shutter drive is in the form of a rotary drive member 5 supported for rotation by a stationary pivot 6 which is carried by the housing 1 and which extends parallel to the optical axis. The rotary shutter drive means 5 has a projection 7 integral therewith and extending therefrom in the manner shown in FIG. 1. The rotary shutter drive means 5 also includes a cam 5a in the form of an equilateral triangle having convexly curved sides, and this cam 5a is located within the interior of the bifurcated portion 2a of the rotary shutter ring, so that during rotation of the shutter drive means around the pin 6 the cam 5a will cause the shutter ring to turn from a starting position where the shutter is closed to an end position where the shutter is open and then back to the starting position, the entire cycle of operations being completed when the rotary shutter drive has turned through a single revolution, as is conventional. The projection 7 has a control edge 8 and an outer edge 9.

A timing means according to the present invention is also carried by the support means formed by the housing 1 and cooperates with the rotary shutter drive means 5 to retard the operation thereof to a preselected extent. This timing means of the invention includes a double crank linkage, the cranks 10 and 11 of which are in the form of discs so that these cranks have the desired amount of mass and will thus produce the desired amount of retarding action. Also, these crank discs 10 and 11 of the double crank linkage have the construction of escapement wheels, and they respectively cooperate with the anchors 12 and 13 to form escapement mechanisms which also form part of the timing means of the invention and are adapted to be selectively placed into or out of operation to provide the preselected extent of retarding of the operation of the shutter drive means 5. The cranks 10 and 11 are respectively supported for rotary movement by the stationary pins 14 and 15 carried by the housing 1, and these cranks of the double crank linkage are interconnected by the coupler or coupling member 16 of the double crank linkage, the coupler 16 being pivotally connected to the cranks 10 and 11 by the pivot pins 18 and 17, respectively, which are carried by the cranks for rotary movement therewith. At its right end, as viewed in FIG. 1, the coupler 16 is extended so as to form a pawl terminating in the end portion 19, and inasmuch as this coupler 16 will have a predetermined path of movement during simultaneous turning of the cranks 10 and 11 the end 19 of the pawl portion of the coupler 16 will move along the curve 20 during operation of the four-bar linkage. A return spring 21 is connected at one end to the support means formed by the housing 1 and at its opposite end to the crank 11 so as to tend to urge the entire four-bar linkage to a predetermined starting or rest position. When the operator sets a selected exposure time into the camera, the operator sets in a known way a stepped cam 23 whose camming portion only is shown in dot-dash lines in FIG. 1 for the sake of clarity, and in accordance with the position of the cam 23, a preselected part thereof will be engaged by the pin 22 which is carried by the crank 11 of the double crank linkage, and it will be noted that the spring 21 urges the pin 22 against the stepped cam 23, so that in this way the double-crank linkage is placed in a preselected position which will control the extent to which the timing means retards the operation of the shutter drive means 5. As is well known when the exposure time has one value a selected step of the cam 23 will engage the pin 22, while another value of the exposure time another step of the cam will engage the pin 22 so as to place the double crank linkage of the invention in a different position to provide a different degree of retarding of the shutter drive means 5.

Also in accordance with the present invention, the escapement wheel formed by the crank 10 cooperates with the anchor 12 which is supported on a turntable lever 25. The anchor 12 is pivotally carried by a pivot pin 24 which is carried by the lever 25, and the lever 25 itself is pivotally supported by a stationary pin 26 which is carried by the support means or housing 1. A spring 27 is coiled about the pin 26, engages with one end a stationary pin carried by the housing 1, and engaging with its other end against a pin carried by the lever 25 so as to urge the latter in a counterclockwise direction, as viewed in FIG. 1, and the lever 25 also carries a pin 28 which cooperates with a second cam means in the form of a control cam 29 which is also shown only in dot-dash lines for the sake of clarity, this control cam 29 also being shifted by the operator depending upon the particular exposure time which is set into the camera. As may be seen from FIG. 1, in the position of the parts illustrated the cam 29 cooperates with the pin 28 to maintain the lever 25 in opposition to the spring 27 at an angular position where the anchor 12 cooperates with the escapement wheel 10 so that this escapement mechanism will be operative with the setting illustrated. However, as may be seen from FIG. 1, when the cam 29 is shifted in a clockwise direction around the optical axis the step of the cam will move to the right beyond the pin 28 and the spring 27 will then be able to turn the lever 25 in a counterclockiwse direction, as viewed in FIG. 1, to a position where the anchor 12 is located beyond the range of turning of the escapement wheel 10, so that at this time the escapement mechanism will not work and there will of course be a corresponding decrease in the extent to which the drive means is retarded.

The embodiment of the invention which is illustrated in FIG. 1 also includes a second anchor 13, as pointed out above, which is adapted to cooperate with the crank 11 which also has the construction of an escapement wheel. The crank 13 is pivotally supported by a pivot pin 30 which is carried by a lever 31 which is pivotally supported by a pin 32 which is carried by the support means 1, and a spring 33 is coiled around the pin 32, engages with one end a stationary pin carried by the housing 1, and engaged with its opposite end a pin carried by the lever 31 so as to urge the latter to turn in a counterclockwise direction around the pivot 32. The lever 31 also carries a pin 34 which cooperates with a cam 35 whose angular position is controlled by the operator depending upon the particular exposure time which is set into the camera. In the position of the parts illustrated the pin 34 engages a portion of the cam 35 which allows the spring 33 to locate the lever 31 in an angular position where the anchor 13 is beyond the range of the escapement wheel 11 so that the escapement mechanism 11, 13 does not operate at this time. However, it will be seen that when the cam 35 is shifted angularly in a clockwise direction around the optical axis it will cooperate with the pin 34 to turn the lever 31 in a clockwise direction so as to place the anchor 13 in engagement with the wheel 11 so that at this time the escapement mechanism 11, 13 will operate and will participate in the extent to which the drive means 5 is retarded.

When the drive means 5 is released upon turning of the control lever 3, the drive means 5 will start to turn in a counterclockwise direction, as viewed in FIG. 1 and as is indicated by the arrow 36, and so the projection 7 will engage the end 19 of the pawl portion of the coupler 16, and at this time the edge 8 of the projection 7 will cooperate with the pawl. The turning drive means will thus shift the coupler 16 to the left, as viewed in FIG. 1, and this movement will continue until the tip of the projection 7 rides over the tip of the end 19 of the pawl portion of the coupler 16, and at this time the pawl portion will engage the outer edge 9 of the projection 7. FIG. 1 shows in dot-dash lines the position of the coupler 16 and the projection 7 at the moment when the tip of the coupler 16 and the projection 7 engage each other. Thus, as the coupler moves the cranks 10 and 11 will be turned. The timing means of the invention operates on the drive means 5 by adding the mass of the double crank linkage to that of the drive means 5 itself as the mass which must be moved by the drive means 5, and this mass of the double crank linkage is added to that of the drive means 5 at the portion of the operation when the shutter is open so that in this way the shutter will be maintained open for a preselected period of time. Thus, with this arrangement as well with the selective placing of either of the escapement mechanisms into operation the rotary movement of the drive means will be retarded to a preselected degree so that the shutter will remain open for the preselected time. Because of the various settings of the double crank linkage which are produced by the selected position of the cam 23, as well as by reason of the selected placing of the anchors 12 or 13 in their operating positions, the timing means of the invention provides the desired range of exposure times which are required to take photographs under different lighting conditions. After the edge 9 of the projection 7 moves beyond the coupler 16 at the end 19 of the latter, the spring 21 returns the double crank linkage to its original setting determined by the cam 23, and this return of the timing means to its preset position takes place while the drive means 5 continues to turn so as to close the shutter in a known way.

Of course, the timing means of the invention described above and shown in FIG. 1 does not find its sole utility with a rotary drive means 5 which turns through the timing means of the invention with any shutter drive means such as, for example, a shutter drive means which oscillates back and forth. Also, it is not essential that the control pin 22 which cooperates with the cam 23 be located on the crank 11 of the double crank linkage. It is also possible in some situations to arrange a pin corresponding to pin 22 on the crank 10, or a control pin may be located on the coupler 16, or all of these pins may be used and may be brought selectively into operation for controlling the position of the double crank linkage of the invention. Of course, the cranks 10 and 11 instead of being in the form of circular discs can take the form of segments, and in this case the cranks would of course have less mass than in the case where they are complete discs as shown in FIG. 1. In some cases, particularly where it is desired to provide relatively long exposure times on the order of one second, for example, it is possible to provide a transmission cooperating with one or both of the anchors 12 and 13 so as to place the latter in its operative position. The gears of such a transmission, particularly where a damping material of relatively low modulus of elasticity is used for the cranks 10 and 11 is insulated to such an extent from the shock imparted to the timing mechanism upon engagement of the coupler with the drive means so that a premature wearing away of the teeth or pivot pins of the transmission will not occur and need not be feared. In an arrangement of this type the cranks 10 and 11 may be made of a polyamide, for example, which is a preferred material of low modulus of elasticity for providing the desired damping.

The embodiment of the invention which is illustrated in FIG. 2 renders it possible to provide relatively short exposure times. The shutter housing 101 has the shutter ring 103 turnable about the central tubular portion 102, and the cam 104 cooperates with the shutter ring 103 to operate the latter back and forth during rotary movement of the shutter drive means 106 about the stationary pin 105 which is carried by the support means or housing 101. The drive 106 is supported for rotary movement by the pin 105. The stopping and starting of the drive takes place in a known way through the lever 107 which is turnable about the stationary pin 108. The rotary drive means 106 includes a projection 109 which has a control edge 110 which engages the end 111 of the coupler 112 of the double crank linkage of FIG. 2, the right free end portion of the coupler 112 acting as a pawl in the embodiment of FIG. 2 also. The coupler 112 is connected by pivot pin 114 with the crank 113 of the double crank linkage, this crank 113 being in the form of a disc in the illustrated example, and the crank 113 is turnable about the stationary pin 115 which is carried by the housing 101. A return spring 116 is operatively connected with the crank 113 to urge the latter in a clockwise direction, as viewed in FIG. 2, toward a predetermined rest or starting position, and the crank 113 carries a control pin 117 which cooperates with a cam 118 whose position is determined by the operator when the exposure time is set into the camera, and in accordance with the position of the cam 118 the spring 116 will act on the disc 113 to locate the latter at a preselected angular position determined by the engagement of the pin 117 with the cam 118, and in this way the double crank linkage of the FIG. 2 is set at a preselected position which will produce the preselected degree of retarding of the shutter drive means.

In accordance with the present invention the second crank 121 of the double crank linkage is not permanently connected with the coupler 112 by a pivot connection. Instead there is provided in accordance with the present invention a pin-and-slot connection between the coupler 112 and the crank 121, and this pin-and-slot connection includes the arcuate slot 120 formed in the crank 121 and the pin 119 which is carried by the coupler 112 and extends into the arcuate slot 120. The crank disc 121 is supported for rotary movement by a stationary pin 122 which is carried by the support means 101, and the crank disc 121 carries a control pin 124 which cooperates with a stepped cam 125 whose position is controlled by the operator in a known way depending upon the particular exposure time which is set into the camera, and a spring 123 is connected to the crank disc 121 to urge the latter to turn in a clockwise direction, as viewed in FIG. 1, so that the pin 124 will be maintained in engagement with the cam 125, and thus the angular position of the crank disc 121 of the double crank linkage will be determined.

Assuming that the parts are in the position shown in FIG. 2 where the pin 119 engages the upper end of the slot 120, as viewed in FIG. 2, when the rotary shutter drive means 106 is released so as to turn in the direction of the arrow 126 of FIG. 2, the projection 109 will engage the end 111 of the coupler 112 to urge the latter to the left, as viewed in FIG. 2, and thus the coupler will turn the cranks 113 and 121 in opposition to the springs 116 and 123, respectively. In this way the retarding of the drive means is derived from the mass of the double crank linkage 112, 113, 121 as well as to a somewhat lesser extent through the force of the springs 116 and 123, so that the operation of the shutter drive will be retarded to the preselected extent.

Because of the pin-and-slot connection 119, 120 it is possible by operation of the cam 125 to turn the disc 121 to an angular position where the pin 119 is spaced from the end of the slot which it is shown engaging in FIG. 2, and the other extreme position for the slot 120 is indicated in dot-dash lines in FIG. 2. In this way when the coupler 112 is in the illustrated position ready to be engaged by the projection 109, the mass of the crank 121 of the double crank linkage will not participate in the retarding of the rotary shutter drive and thus considerably less retarding force will be provided, and the instant when the retarding force provided by the mass of the crank 121 is brought into play can be determined by the angular position of the disc 121 controlled by the cam 125, the disc coming into play as soon as the pin 119 engages the end of the slot 120 so as to start to turn the disc 121. Thus, by controlling the extent to which the coupler 112 will move before starting the turning of the crank 121 the retarding action of the timing means of FIG. 2 can be reduced as desired. When the slot 120 has the dot-dash line position indicated in FIG. 2 the disc 121 has been turned to the position which will locate the mass 121 out of the operation to the maximum extent. In this event the slot 120 cooperates with the pin 119 solely as a guide for the latter. As is shown in FIG. 2, the slot 120 may extend along a circle whose center is in the axis of the pin 122. In this way the cooperation between the end 111 of the coupler 112 and the surface 110 of the projection 109 remains the same as if the coupler 112 were pivotally connected to the crank 121. Of course, it is possible to further reduce the retarding action of the timing means of the invention of the shutter drive means by acting through the cam 118 on the pin 116 so as to place the end 111 of the coupler 112 at a position where the drive means rotates freely through a relatively large extent before engaging the end 111 to be retarded by the timing means of the invention. Thus, as will be seen that if the exposure time setting is carried out in such a way that the cam 118 is shifted to the left, as viewed in FIG. 2, the step of the cam 118 will cooperate with the pin 117 to turn the crank 113 in a counterclockwise direction, as viewed in FIG. 2 moving the coupler 112 to the left and locating the end 111 thereof at a distance from the tooth 109 greater than that shown in FIG. 2. Of course, after the projection 109 rides past the end 111 of the coupler 112 the spring 116 operates to return the double crank linkage of the embodiment of FIG. 2 back to its starting position determined by the engagement of the pin 117 with the cam 118. The same is true of the crank 121 which is returned by the spring 123 to its preset position determined by cooperation of the pin 124 with the cam 125.

As was mentioned above, the cranks of the double crank linkages of the invention may be made of a material which has a relatively low modulus of elasticity, preferably a polyamide, so that the shocks resulting from engagement of the tooth 7 or 109 of the shutter drives of FIGS. 1 and 2, respectively, will be damped. Moreover, in the same way the shocks between the anchors and escapement wheels are damped, so that a long life of efficient operation is assured particularly as compared to parts made of conventional materials such as German silver or steel. According to a further feature of the invention, if it is desired to increase the mass of the crank discs, they may be made of brass or steel or any other desired heavy metal, and the anchors can then be made of a material of low modulus of elasticity, preferably polystyrene, particularly at the portions of the anchors which cooperate with the escapement wheels. As the material of low modulus of elasticity plastics such as polystyrene or a polyamide are highly suitable and preferred, and also in some cases a solid lubricant may be incorporated into the plastic material, such a solid lubricant being in the form of graphite or molybdenum sulfide.

Of course, it is possible to combine the features of FIGS. 1 and 2, for example, by providing the crank 11 with an arcuate slot similar to the slot 120 and in which the pin 17 extends, or in the embodiment of FIG. 2 one or both of the discs 121 and 113 may take the form of escapement wheels and anchors may cooperate therewith and be supported in the manner shown in FIG. 1.

With the arrangement of the invention a wide range of operative relationships between the components is possible so as to give several different degrees of retarding of the shutter drive. Thus, it is possible to operate as shown in FIG. 2 with only one crank disc and without any escapement mechanism. Also, where an escapement is provided to cooperate with the disc 113 it is possible to operate with only the retarding force provided by the mass of this disc 113 plus the retarding provided by one escapement mechanism. A third possibility can be provided with the embodiment of FIG. 1 where both of the crank discs of the double crank linkage lend their retarding force but where both of the anchors are in an inoperative position so that the retarding is derived solely from the double crank. Of course, it is possible to derive the same type of operation with FIG. 2 when the disc 121 is in an angular position locating the slot 120 in the solid line position indicated in FIG. 2. A fourth possibility can be derived from an arrangement as shown in FIG. 1 where only one of the anchors is in the range of its escapement wheel to provide the retarding force derived from one escapement mechanism, and of course it is also possible to place the escapement 12 out of its operating position and to operate only with the escapement 13. Finally, it is possible to operate with both of the escapement anchors 12 and 13. In addition, the extent to which the rotary drive engages the coupler of the double crank linkage can be regulated as described above. In this way a wide range of degrees of retarding of the shutter drive can be obtained to provide the flexibility desired in the exposure times, and at the same time it will be noted that there are no gears to be worn out and the parts are very robustly constructed so that a long life of efficient operation is assured.

It will be understood that each of the elements described above, or two or more together, may also find a useful application in other types of cameras differing from the types described above.

While the invention has been illustrated and described as embodied in camera shutters, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera shutter assembly, in combination, support means; rotary drive means carried by said support means for driving a shutter, said rotary drive means having a projection; and timing means carried by said support means for retarding the operation of said rotary drive means, said timing means including a double crank linkage made up of a pair of rotary cranks and an elongated coupling member extending between and pivotally connected to said cranks, said coupling member having an elongated free end portion extending beyond one of said cranks and located in the path of turning movement of said projection and acting as a pawl in cooperation with said projection so that the latter engages said coupling member to cause the timing means to cooperate with the drive means to retard the operation thereof, whereby the masses of both of the cranks as well as the coupling member of the double crank linkage participate in the retarding action of the timing means.

2. In a shutter assembly as recited in claim 13, said escapement wheel being made of brass.

3. In a shutter assembly as recited in claim 13, said escapement wheel being made of steel.

4. In a shutter assembly as recited in claim 13, said anchor being made of a polyamide.

5. In a shutter assembly as recited in claim 14, said solid lubricant being in the form of molybdenum sulfide.

6. In a shutter assembly as recited in claim 14, said lubricant being in the form of graphite.

7. In a camera shutter assembly, in combination, support means; rotary drive means carried by said support means for driving a shutter, said rotary drive means having a projection; and timing means carried by said support means for retarding the operation of said rotary drive means, said timing means including a double crank linkage made up of a pair of rotary cranks and an elongated coupling member extending between and pivotally connected to said cranks, said coupling member having a free end portion extending beyond one of said cranks and located in the path of turning movement of said projection and acting as a pawl in cooperation with said projection so that the latter engages said coupling member to cause the timing means to cooperate with the drive means to retard the operation thereof, the cranks of the linkage being in the form of discs, whereby the masses of both cranks and the coupling member participate in the retarding action of the timing means.

8. In a camera shutter assembly, in combination, support means; rotary drive means carried by said support means for driving a shutter, said rotary drive means having a projection; and timing means carried by said support means for retarding the operation of said rotary drive means, said timing means including a double crank linkage made up of a pair of rotary cranks and an elongated coupling member extending between and pivotally connected to said cranks, said coupling member having a free end portion located in the path of turning movement of said projection and acting as a pawl in cooperation with said projection so that the latter engages said coupling member to cause the timing means to cooperate with the drive means to retard the operation thereof, the cranks of the linkage being in the form of discs at least one of which is constructed as an escapement wheel, and said timing means including an escapement anchor cooperating with said escapement wheel, whereby the masses of both cranks and the coupling member as well as the cooperation of the escapement wheel and anchor participate in the retarding action of the timing means.

9. In a camera shutter assembly, in combination, support means; rotary drive means carried by said support means for driving a shutter, said rotary drive means having a projection; and timing means carried by said support means for retarding the operation of said rotary drive means, said timing means including a double crank linkage, the coupling member of which, coupling the cranks of the linkage, has a free end portion located in the path of turning movement of said projection and acting as a pawl in cooperation with said projection so that the latter engages said coupling member to cause the timing means to cooperate with the drive means to retard the operation thereof, the cranks of the linkage being in the form of discs, and said timing mechanism including a pin-and-slot connection between one of said discs and said coupling member so that according to the angular position of said one disc it is possible to place the latter into or out of operation in order to selectively participate in the retarding of the drive means.

10. In a camera shutter assembly, in combination, support means; rotary drive means carried by said support means for driving a shutter, said rotary drive means having a projection; timing means carried by said support means for retarding the operation of said rotary drive means, said timing means including a double crank linkage, the coupling member of which, coupling the cranks of the linkage, has a free end portion located in the path of turning movement of said projection and acting as a pawl in cooperation with said projection so that the latter engages said coupling member to cause the timing means to cooperate with the drive means to retard the operation thereof, the cranks of the linkage being in the form of discs at least one of which is constructed as an escapement wheel, and that timing mechanism including an escapement anchor cooperating with said escapement wheel; first cam means carried by said support means and cooperating with said double crank linkage at one of the cranks thereof for selectively controlling the position of said crank; and second cam means cooperating with said anchor for controlling the position thereof with respect to said escapement wheel.

11. In a camera shutter assembly, in combination, support means; rotary drive means carried by said support means for driving a shutter, said rotary drive means having a projection; and timing means carried by said support means for retarding the operation of said rotary drive means, said timing means including a double crank linkage made up of a pair of rotary cranks and an elongated coupling member extending between and pivotally connected to said cranks, said coupling member having a free end portion located in the path of turning movement of said projection and acting as a pawl in cooperation with said projection so that the latter engages said coupling member to cause the timing means to cooperate with the drive means to retard the operation thereof, the cranks of the linkage being in the form of discs of a material which has a relatively low modulus of elasticity, whereby the masses of both cranks and the coupling member participate in the retarding action of the timing means.

12. An arrangement as defined in claim 7 in which said discs are made of polyamide.

13. An arrangement as defined in claim 8 in which said escapement wheel is made of a material of high specific weight and in which said anchor cooperating with said escapement wheel is made of material which has a relatively low modulus of elasticity.

14. An arrangement as defined in claim 7 in which at least part of the structure of said linkage is made up of a material of a low modulus of elasticity, and said material of a low modulus of elasticity having incorporated into itself a solid lubricant.

References Cited in the file of this patent

UNITED STATES PATENTS

| | | |
|---|---|---|
| 2,047,662 | Barenyi | July 14, 1936 |
| 2,327,591 | Brueck | Aug. 24, 1943 |

FOREIGN PATENTS

| | | |
|---|---|---|
| 138,468 | Austria | Aug. 10, 1934 |